(12) United States Patent
Kwon et al.

(10) Patent No.: US 7,764,651 B2
(45) Date of Patent: Jul. 27, 2010

(54) METHOD AND SYSTEM FOR TRANSMITTING REVERSE DATA IN A MOBILE COMMUNICATION SYSTEM

(75) Inventors: Hwan-Joon Kwon, Gyeonggi-do (KR); Youn-Sun Kim, Seongnam-si (KR); Jin-Kyu Han, Suwon-si (KR); Dong-Hee Kim, Seoul (KR); Jung-Soo Jung, Seoul (KR); Beom-Sik Bae, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 24 days.

(21) Appl. No.: 12/029,882

(22) Filed: Feb. 12, 2008

(65) Prior Publication Data

US 2008/0137614 A1     Jun. 12, 2008

Related U.S. Application Data

(63) Continuation of application No. 11/083,845, filed on Mar. 18, 2005, now abandoned.

(30) Foreign Application Priority Data

Mar. 18, 2004   (KR) ............................... 2004-18587

(51) Int. Cl.
*H04W 4/00*     (2009.01)
(52) U.S. Cl. ..................... 370/331; 370/338; 370/468; 455/13.4; 455/522
(58) Field of Classification Search ............... 455/436, 455/439, 440, 450, 452.1, 522, 13.4; 370/310.2, 370/328, 331, 332, 334, 229, 235–236, 317–319, 370/342, 352, 468; 709/232
See application file for complete search history.

(56) References Cited

U.S. PATENT DOCUMENTS

| 6,678,257 B1 | 1/2004 | Vijayan et al. |
| 2003/0054773 A1 | 3/2003 | Vanghi |

(Continued)

FOREIGN PATENT DOCUMENTS

| CN | 1383637 | 12/2002 |

(Continued)

OTHER PUBLICATIONS

CDMA 2000 High Rate Packet Data Air Interface Specification, version 0.3, dated Feb. 2004, supplied with IDS dated Jan. 11, 2008.*

(Continued)

*Primary Examiner*—Dwayne Bost
*Assistant Examiner*—Inder P Mehra
(74) *Attorney, Agent, or Firm*—The Farrell Law Firm, LLP

(57) ABSTRACT

Disclosed is a method for controlling a reverse data rate by a mobile station in a mobile communication system supporting high-rate packet data transmission. The method includes receiving average loading information (FRAB) from a particular base station when the mobile station attempts an initial access to the base station; setting the received average loading information as average loading information for the base station; and upon receiving reverse activity information (RAB) from the base station, controlling a rate of reverse data using the received reverse activity information and the set average loading information.

12 Claims, 3 Drawing Sheets

U.S. PATENT DOCUMENTS

| | | | |
|---|---|---|---|
| 2004/0176042 A1 | 9/2004 | Lott et al. | |
| 2004/0259560 A1 | 12/2004 | Hosein et al. | |
| 2005/0013271 A1* | 1/2005 | Lott et al. | 370/328 |
| 2005/0014524 A1 | 1/2005 | Lott et al. | |
| 2005/0026624 A1 | 2/2005 | Gandhi et al. | |
| 2005/0111397 A1* | 5/2005 | Attar et al. | 370/319 |
| 2005/0193140 A1 | 9/2005 | Tiedemann et al. | |

FOREIGN PATENT DOCUMENTS

| | | |
|---|---|---|
| WO | WO 02/01763 | 1/2002 |
| WO | WO 02/063781 | 8/2002 |
| WO | WO 02/008046 | 10/2002 |
| WO | WO 02/078212 | 10/2002 |

OTHER PUBLICATIONS

Cdma2000 High Rate Packet Data Air Interface Specification, Feb. 2004.

* cited by examiner

METHOD AND SYSTEM FOR TRANSMITTING REVERSE DATA IN A MOBILE COMMUNICATION SYSTEM

PRIORITY

This application is a continuation of application Ser. No. 11/083,845 filed on Mar. 18, 2005, now abandoned and claims priority under 35 U.S.C. §119 to an application filed in the Korean Intellectual Property Office on Mar. 18, 2004 and assigned Serial No. 2004-18587, the contents of which are incorporated herein by reference.

BACKGROUND OF THE INVENTION

1. Field of the Invention

The present invention relates generally to a method and system for transmitting data in a mobile communication system, and in particular, to a method and system for controlling a rate of data transmitted in a reverse direction.

2. Description of the Related Art

Generally, $2^{nd}$ generation (2G) Code Division Multiple Access (CDMA) mobile communication systems provide voice service with low-speed data service through a traffic channel in forward and reverse directions. With the rapid progress of wireless technology, increased amounts of data need to be transmitted at high speeds to provide users with multimedia content and Internet access in addition to simple voice service. To meet user demand, mobile communication systems are developing into advanced systems capable of providing both high-speed data service and voice-oriented service.

The $3^{rd}$ generation (3G) mobile communication system aims at providing high-speed service with a special focus on data-oriented multimedia service.

For example, a 1x Evolution-Data Only (EV-DO) standard, also known as High Data Rate (HDR), has been established by $3^{rd}$ Generation Partnership Project 2 (3GPP2) which is a standardization camp for a synchronous system with the intent to provide a CDMA2000 1x data service. During forward transmission, a 1x EV-DO system transmits packet data to a particular mobile station only. Therefore, the 1x EV-DO system can transmit packet data to the particular mobile station with maximum power at high speed.

A description will now be made of the 1x EV-DO system. For a forward link of the 1x EV-DO system, an access network (AN) or a base station (BS) serves as a transmitter while an access terminal (AT) or a mobile station (MS) serves as a receiver. A physical layer of the 1x EV-DO system adopting a link adaptation scheme adaptively uses various modulation schemes such as Quadrature Phase Shift Keying (QPSK), 8-ary Phase Shift Keying (8PSK) and 16-ary Quadrature Amplitude Modulation (16QAM), with various data rates according to a channel environment. In addition, the 1x EV-DO system supports multimedia service using the same frequency band, and in the system, a plurality of mobile stations can simultaneously transmit data to a base station. In this case, identification of the mobile stations is achieved through spreading codes uniquely allocated to the mobile stations.

In the 1x EV-DO system, data transmission in a reverse direction from a mobile station to a base station is achieved through a reverse packet data channel (R-PDCH) per physical layer packet (PLP), with a fixed packet length. The data rate for each packet is variable, and is based on the power of the receiving mobile station to which a corresponding packet is transmitted, the total amount of data to be transmitted to the mobile station, and information provided from a base station.

While a mobile station attempts to change its connection from a current base station (or serving base station) to a new base station (or target base station) to perform handoff or to set up initial communication, the mobile station cannot receive rate control information from the target base station because the connection to the target base station is not established. Therefore, the mobile station has difficulty in efficiently controlling the rate of transmission for each data packet according to channel conditions.

SUMMARY OF THE INVENTION

It is, therefore, an object of the present invention to provide a reverse rate control method and system in which a mobile station determines its data rate at the time when it first initiates communication with a base station or initiates communication with a new base station to perform handoff.

It is another object of the present invention to provide a method and system in which when a mobile station first initiates communication with a base station or initiates communication with a new base station to perform handoff, the mobile station controls its data rate by determining a system loading condition using base station's loading information provided from the base station.

To achieve the above and other objects, there is provided a method for controlling a reverse data rate upon handoff during reverse communication in a mobile communication system supporting high-rate packet data transmission, the method includes, setting by a mobile station as a FRAB for a target base station upon occurrence of a need for the handoff to the target base station, a FRAB (Filtered Reverse Activity Bit) having a maximum value among FRABs provided for respective base station in an active set and, controlling by a mobile station, the reverse data rate using the received RAB and the set FRAB for the target base station upon receiving RAB (Reverse Activity Bit) from the target base station.

To achieve the above and other objects, there is provided a mobile station apparatus for controlling a reverse data rate upon handoff by the mobile station in reverse communication in a mobile communication system supporting high-rate packet data communication, including a receiver for a RAB (Reverse Activity Bit) from a target base station and a controller. The mobile station sets as a FRAB (Filtered Reverse Activity Bit) for a target base station upon occurrence of a need for the handoff to the target base station, and upon receiving the RAB from the target base station a FRAB (Filtered Reverse Activity Bit) having a maximum value among FRABs provided for respective base station in an active set, determines the reverse data rate using the received RAB and the set FRAB for the target base station.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
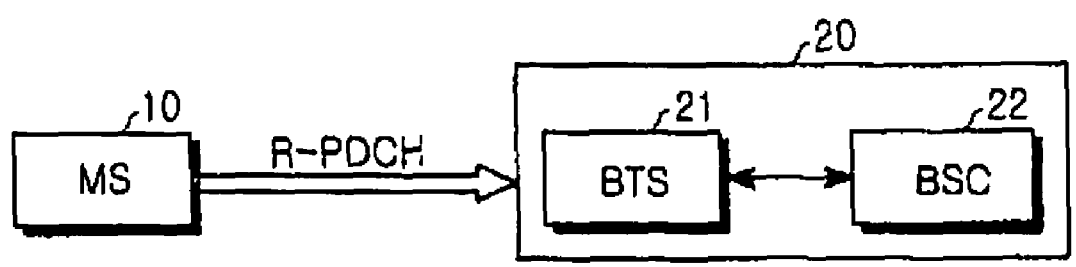
FIG. 1 is a block diagram illustrating a structure of a mobile communication system according to an embodiment of the present invention.

A preferred embodiment of the present invention will now be described in detail with reference to the annexed drawings. In the following description, a detailed description of known functions and configurations incorporated herein has been omitted for conciseness.

Herein, a description of the present invention will be made with reference to a 1x Evolution-Data Only (EV-DO) system using Code Division Multiple Access (CDMA). A description will now be made of controlling the data rate of each packet transmitted in a reverse direction in the 1x EV-DO mobile communication system.

In the 1x EV-DO system, the data rate for each packet transmitted in the reverse direction is controlled based on power of the mobile station to which the corresponding packet is transmitted, the total amount of transmission data, and a system loading condition. That is, a base station generates a Reverse Activity Bit (RAB) which is information determined considering system loading conditions.

Thereafter, the base station transmits the generated RAB to mobile stations through a forward channel. The RAB has a value '+1' or '−1'. A RAB=+1 indicates that the system is busy, and a RAB=−1 indicates that the system is not busy. Each base station transmits the RAB to all mobile stations located in its cell or sector to provide system loading information to the mobile stations. The mobile stations control their reverse data rates according to the system loading condition. Herein, the RAB is transmitted per specific time, for example, every 1.67 ms, also referred to as a slot.

A detailed description will now be made of a process in which a mobile station controls its data rate based on the RAB.

When a mobile station controls a reverse data rate using the received RAB, it uses two parameters of a Quick RAB (QRAB) and a Filtered RAB (FRAB) determined by using the RAB received from the base station. The QRAB, a parameter indicating a reverse loading condition of a base station at a specific time, is a value determined by filtering RABs continuously received from the base station for a relatively short time interval (e.g., 1.67 ms*4). A value of the QRAB is determined by performing hard decision to +1 or −1 on the values filtered in the foregoing manner. The FRAB, a parameter indicating a reverse loading condition of a base station for a long time, which means long term sector loading, is a value determined by filtering RABs continuously received from the base station for a relatively long time interval (e.g., 1.67 ms*256). The FRAB value is a real number between −1 and +1. So, as the FRAB value becomes smaller at a specific time, it indicates that the base station has more frequently transmitted a RAB=−1, indicating the average system loading condition is low.

As the FRAB value becomes larger at a specific time, it indicates that the base station has more frequently transmitted a RAB=+1, and that the average system loading condition is high.

The mobile station controls its reverse data rate using the QRAB and the FRAB. That is, the mobile station determines whether to increase or decrease its data rate according to whether the QRAB value is −1 or +1. If the QRAB value is +1 at a specific time, indicating that the current system loading condition is high, the mobile station attempts to decrease its data rate. On the contrary, if the QRAB value is −1 at a specific time, indicating that the current system loading condition is low, the mobile station attempts to increase its data rate.

Once the mobile station has determined whether to decrease or increase its data rate according to whether the QRAB value is +1 or −1 at a specific time, the mobile station determines how much it will decrease or increase its data rate according to the FRAB value. The FRAB value is used because it indicates a reverse system loading condition for a relatively long time, as described above. For example, assuming that a mobile station attempts to increase its data rate determining that the QRAB value is −1 at a particular time, if the FRAB value is very small, the mobile station is allowed to increase its data rate by a relatively high level without increasing a load on the system. On the contrary, if the FRAB value is very large even though the QRAB value is still −1, the mobile station increases its data rate by a relatively low level.

In the system, a time constant value of a filter, used for generating the QRAB and the FRAB, is provided from a base station to mobile stations through a signaling message. For example, if a base station provides a mobile station with information indicating that a time constant value of a filter used for generating a FRAB is 256*1.67 ms, the mobile station generates a FRAB by averaging and filtering RABs received from the base station for the time of 256*1.67 ms, and uses the generated FRAB value in controlling its data rate.

In a typical cellular system, there are several base stations neighboring a particular base station. In this situation, each base station transmits its own RAB. Therefore, a mobile station in handoff operation receives RABs from several base stations. In this case, the mobile station generates and manages the QRAB and FRQB values separately for each base station. As described above, the FRAB is an average value for RABs received from a base station for a relatively long time interval, and is information indicating an average system loading condition. However, the mobile station cannot determine the FRAB at the time when it initially starts communication with a base station and the time when it starts communication with a new base station to perform handoff. Therefore, an embodiment of the present invention will provide a method for initializing a FRAB value for controlling a reverse system load to determine a data rate at the time when the mobile station first starts communication with a base station and the time when the mobile station starts communication with a new base station to perform handoff. A description will now be made of a structure of a mobile communication system according to an embodiment of the present invention.

FIG. 1 is a block diagram illustrating the structure of a mobile communication system for controlling a reverse rate according to an embodiment of the present invention. Referring to FIG. 1, a mobile communication system includes a mobile station (MS) 10 and a base station system, or a base station (BS) 20, and the base station 20 includes a base station transceiver system (BTS) 21 performing communication with the mobile station 10, and a base station controller (BSC) 22 for controlling the base station transceiver system 21. Herein, the base station system will be referred to as the base station (BS) 20. The mobile station 10 may include a memory, a receiver and a controller (not shown). Software, or a program, residing on the memory, controls the controller, and thereby, the mobile station, to perform the specific functions described herein.

The mobile station 10 transmits packet data to the base station 20 through a reverse packet data channel (R-PDCH). The mobile station 10 receives a RAB from the base station

20. The mobile station 10 generates average loading information FRAB using the RABs continuously received for a predetermined time (for example, 1.67 ms*256), or using FRAB values for old base stations (not shown) at initial access to a target base station after performing handoff from a serving base station, and then updates the generated FRAB value as average loading information FRAB to be used in the current base station.

The base station 20 generates a system loading information RAB using a method for measuring a Rise-of-Thermal (RoT) that indicates a ratio of a thermal noise to the total reverse reception power. Alternatively, the base station 20 may use a method using the total load. After generating the RAB, it is transmitted to the mobile station 10 through a forward channel.

Preferably, when the base station 20 is initially connected to the mobile station 10 and/or when it is initialized to perform handoff, the base station 20 sets an initial FRAB value at the initialization time and transmits the initial FRAB value to the mobile station 10. Then the mobile station 10 sets the FRAB value received from the base station 20 to a FRAB to be used later, and determines an increasing/decreasing step for its reverse data rate using received RAB and QRAB.

A description will now be made of a method in which a mobile station controls a data rate by initializing a FRAB value at the time when it first accesses a base station and the time when it attempts to access a new base station to perform handoff.

An initialization method for the FRAB value can be roughly divided into two methods. The first method transmits an initial FRAB value through a signaling message to a mobile station initiating communication either with a base station or a new base station to perform a handoff. The second method is for a mobile station initiating communication with a new base station to perform handoff. In this method, the mobile station sets an initial FRAB value for the new base station by itself, depending on FRAB values for its old base stations.

A detailed description will now be made of the two methods. With reference to the accompanying drawing, a description will now be made of the first FRAB initialization method according to a first embodiment of the present invention.

Figure 2:
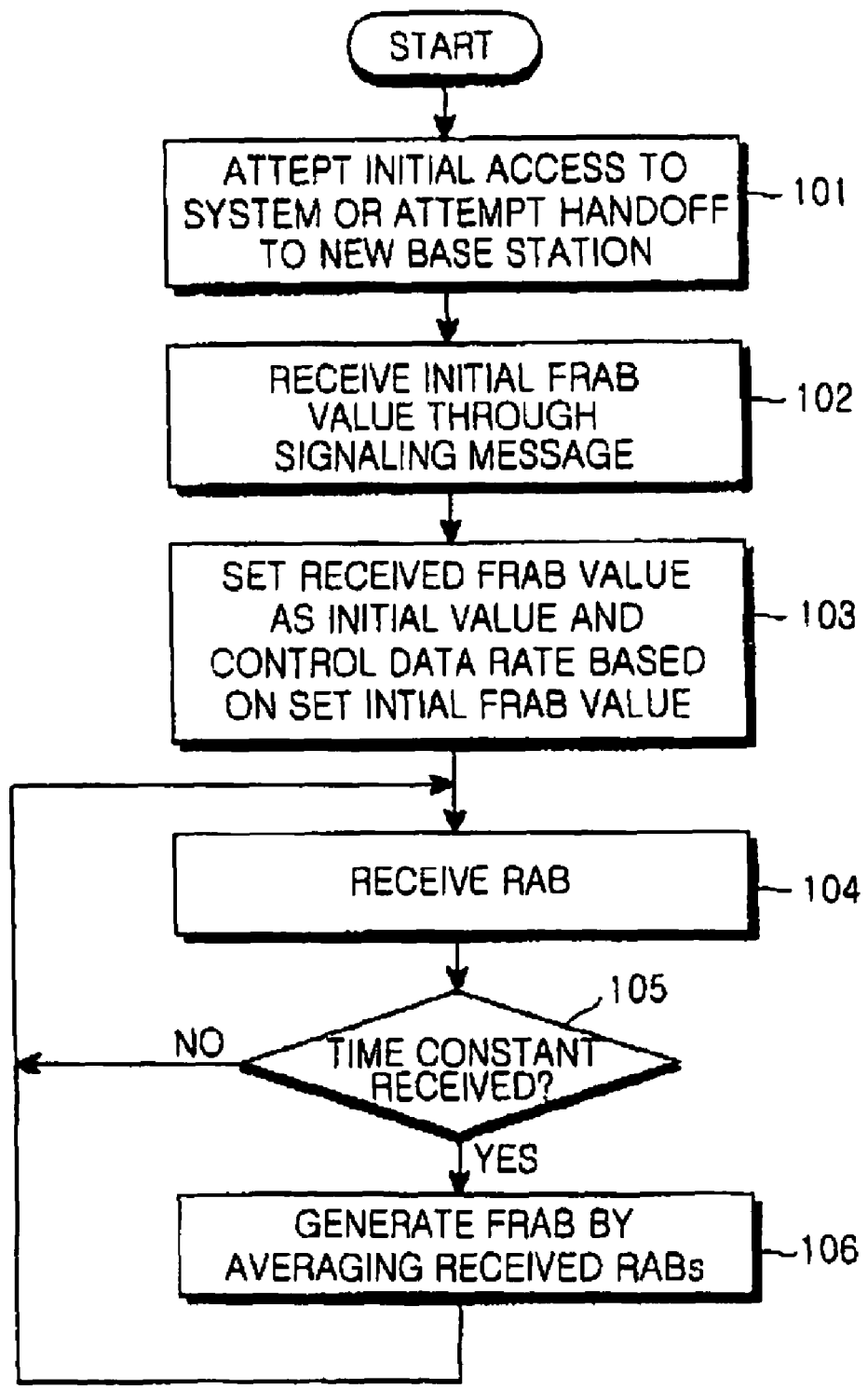
FIG. 2 is a flowchart illustrating an operation of receiving, by a mobile station, system loading information from a base station according to an embodiment of the present invention.

FIG. 2 is a flowchart illustrating an operation of receiving system loading information from a base station according to an embodiment of the present invention in a mobile station. Referring to FIG. 2, in step 101, a mobile station attempts an initial access to a system or attempts handoff to a new base station. At this point, the mobile station has no QRAB and FRAB for reverse communication with the new base station. In step 102, the mobile station receives an initial FRAB value from a target base station through a signaling message. The base station can randomly set the initial FRAB value, or transmit RABs to a mobile station so that the mobile station can set the initial FRAB value by averaging the RABs transmitted from the base station. Alternatively, the initial FRAB value can be generated using a separate algorithm. As a further alternative, the initial FRAB value can be previously set through a parameter message during initial call setup.

In step 103, the mobile station sets a FRAB value received from the base station as an initial value, and determines how much it will increase or decrease the current data rate according to the received FRAB value. Thereafter, in step 104, the mobile station receives from the base station a RAB indicating current business of the base station or system loading information. The mobile station determines, in step 105, whether a time constant value of a filter has been received from the base station. Upon failure to receive the time constant value, the mobile station returns to step 104.

If, however, the time constant value is received, the mobile station proceeds to step 106 where it generates a FRAB by averaging RABs received for the time constant value received from the base station, for example, 256*1.67 ms as described above, and updates the generated FRAB value as a FRAB for the corresponding base station. Thereafter, the mobile station returns to step 104. Although it is shown that the mobile station receives the time constant value in step 105, the mobile station may skip step 105 in the case where the time constant value is preset in the mobile station.

Next, with reference to the accompanying drawing, a description will be made of the second FRAB initialization method according to a second embodiment of the present invention.

The second method is for a mobile station initiating communication with a new base station to perform handoff, and in this method, the mobile station sets an initial FRAB value for the new base station depending on FRAB values for its old base stations.

Figure 3:
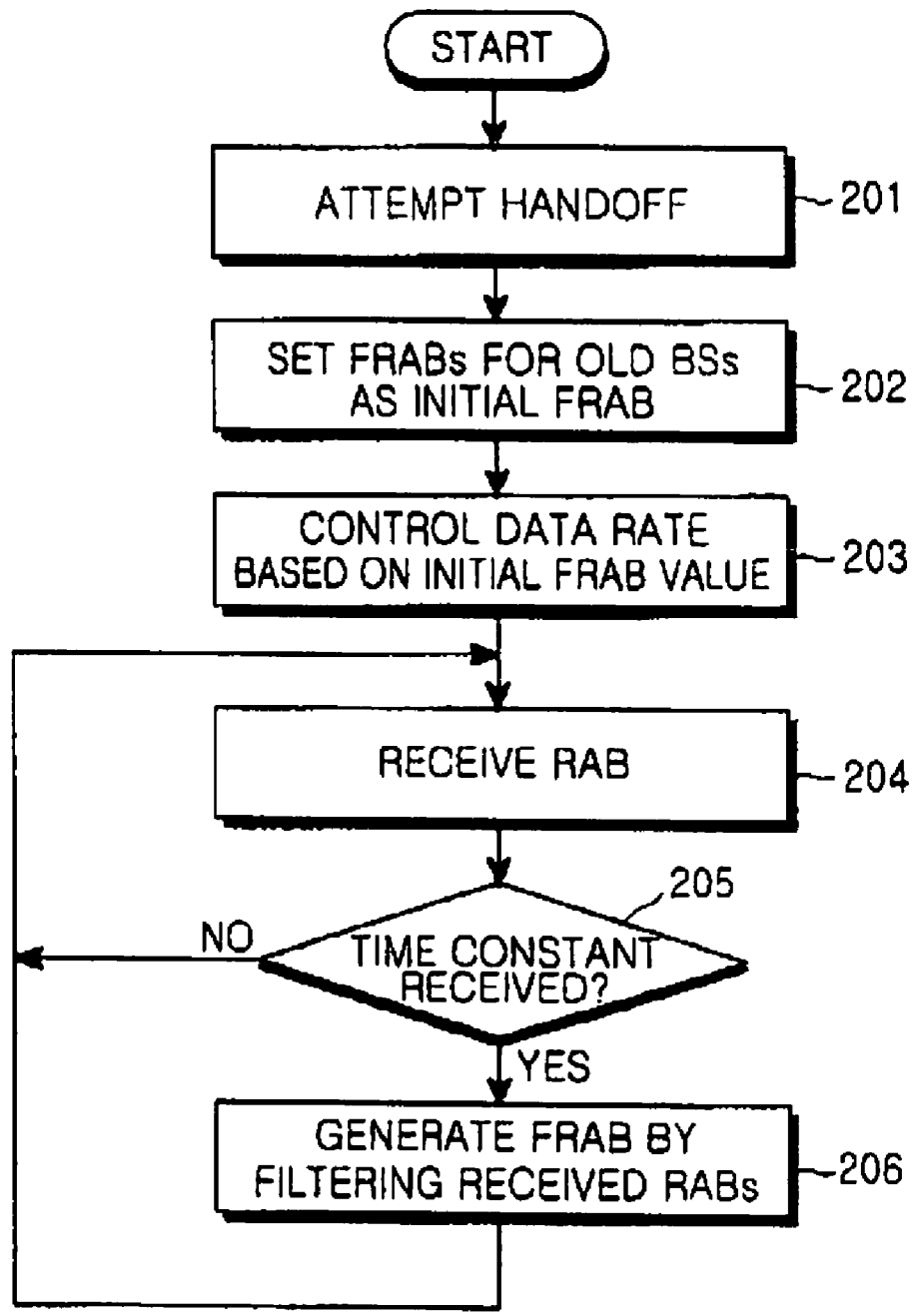
FIG. 3 is a flowchart illustrating an operation of setting, by a mobile station, an initial FRAB value for a new base station depending on FRAB values for its old base stations according to an embodiment of the present invention.

FIG. 3 is a flowchart illustrating an operation of setting, by a mobile station, an initial FRAB value for a new base station depending on FRAB values for its old base stations according to an embodiment of the present invention. Referring to FIG. 3, in step 201, a mobile station attempts handoff to a new base station. In step 202, the mobile station sets FRAB values for its old base stations as an initial FRAB value for the new base station to set a FRAB value for the target base station.

Thereafter, in step 203, the mobile station determines how much it will increase or decrease a current data rate using the set initial FRAB value. In step 204, the mobile station receives a RAB from the base station. Thereafter, the mobile station determines in step 205 whether a time constant value of a filter has been received from the base station. Upon failure to receive the time constant value, the mobile station returns to step 204. Upon receiving the time constant value, the mobile station proceeds to step 206 where it generates a FRAB by filtering the RAB for a time corresponding to the received time constant value, for example, 256*1.67 ms. In addition, the mobile station updates the generated FRAB value as a FRAB value for the base station, and then returns to step 204. Although it is shown that the mobile station receives the time constant value in step 205, the mobile station may skip step 205 in the case where the time constant value is preset in the mobile station.

A detailed description will now be made of three methods for setting, in step 203, an initial FRAB value for a new base station using FRAB values for its old base stations.

In the first method, the mobile station can use an average value of FRABs of its old base stations with which it has previously communicated, as an initial FRAB value for a new base station. For example, assume a mobile station performs handoff from a base station A and a base station B to a new base station C. If the FRAB value for the base station A is −0.5 and the FRAB value for the base station B is −0.4, the mobile station sets an initial FRAB value for the new base station C to −0.45, the average of the two FRABs. This method using an average value available when several base stations have similar reverse load conditions.

In the second method, the mobile station uses a minimum value among FRAB values for its old base stations as an initial FRAB value for a new base station. For example assume a mobile station performs handoff from a base station A and a base station B to a new base station C. If the FRAB value for the base station A is −0.5 and the FRAB value for the base station B is −0.4, the mobile station sets an initial FRAB value for the new base station C to −0.5, the minimum value of the two FRABs. This method is aggressive because the mobile station initializes a reverse load level of the newly added base station to a relatively low value.

In the third method, the mobile station uses a maximum value among FRAB values for its old base stations as an initial FRAB value for a new base station. For example, assume a mobile station performs handoff from a base station A and a base station B to a new base station C. If the FRAB value for the base station A is −0.5 and the FRAB value for the base station B is −0.4, the mobile station sets an initial FRAB value for the new base station C to −0.4, the greater FRAB of the two. This method is stable because the mobile station initializes a reverse load level of the newly added base station to a relatively high value.

As can be understood from the foregoing description, according to the present invention, a mobile station sets an initial FRAB value indicating average loading information of a base station at the time when it initially attempts to start communication with a base station, or at the time when it attempts communication with a new base station when performing a handoff. In this manner, the mobile station can correctly determine a system loading condition in determining its data rate, making it possible to efficiently control a reverse system load.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for initializing a Filtered Reverse Activity Bit (FRAB) that indicates long term sector loading in a mobile communication system supporting high-rate packet data transmission, the method comprising:
    updating, by a mobile station, a FRAB in an active set into a maximum value among a plurality of FRABs of all sectors in the active set; and
    initializing, by the mobile station, a FRAB for a new sector, upon inclusion of the new sector into the active set, the initialized FRAB being equal to the updated FRAB.

2. The method of claim 1, wherein each of the FRABs is a real number between +1 and −1.

3. The method of claim 1, wherein the FRAB in the active set is updated periodically.

4. The method of claim 1, wherein upon inclusion of the new sector, the mobile station performs a handoff to the new sector.

5. The method of claim 1, wherein upon inclusion of the new sector into the active set, the FRAB for the new sector is initialized without long term filtering Reverse Activity Bits (RABs) consecutively received from the new sector.

6. A mobile station apparatus for initializing a Filtered Reverse Activity Bit (FRAB) that indicates long term sector loading in a mobile communication system supporting high-rate packet data transmission, the apparatus comprising:
    a receiver for receiving Reverse Activity Bits (RABs) from each sector in an active set; and
    a controller for updating a FRAB in an active set into a maximum value among a plurality of FRABs of each of the sectors in the active set, and upon inclusion of a new sector into the active set, initializing a FRAB for the new sector,
    wherein the initialized FRAB is equal to the updated FRAB.

7. The apparatus of claim 6, wherein each of the FRABs is a real number between +1 and −1.

8. The apparatus of claim 6, wherein the FRAB in the active set is updated periodically.

9. The apparatus of claim 6, wherein upon inclusion of the new sector, the mobile station performs a handoff to the new sector.

10. The apparatus of claim 6, wherein upon inclusion of the new sector into the active set, the FRAB for the new sector is initialized without long term filtering RABs consecutively received from the new sector.

11. A mobile station apparatus for initializing a Filtered Reverse Activity Bit (FRAB) that indicates long term sector loading in a mobile communication system supporting high-rate packet data transmission, the apparatus comprising:
    a receiver for receiving Reverse Activity Bits (RABs) from each sector in an active set; and
    a controller for updating a FRAB in an active set into a maximum value among a plurality of FRABs of each of the sectors in the active set, and upon inclusion of a new sector into the active set, initializing a FRAB for the new sector,
    wherein the initialized FRAB is equal to the updated FRAB.

12. A mobile station apparatus for initializing a Filtered Reverse Activity Bit (FRAB) that indicates long term sector loading in a mobile communication system supporting high-rate packet data transmission, the apparatus comprising:
    a memory for storing a program thereon; and
    a controller for, under direction of the program of the memory, updating a FRAB in an active set into a maximum value among a plurality of FRABs of all sectors in an active set, and upon inclusion of a new sector into the active set, initializing a FRAB for the new sector,
    wherein the initialized FRAB is equal to the updated FRAB.

* * * * *